F. L. HENIG.
INLET OR CHECK VALVE.
APPLICATION FILED DEC. 4, 1918.
1,350,610.
Patented Aug. 24, 1920.
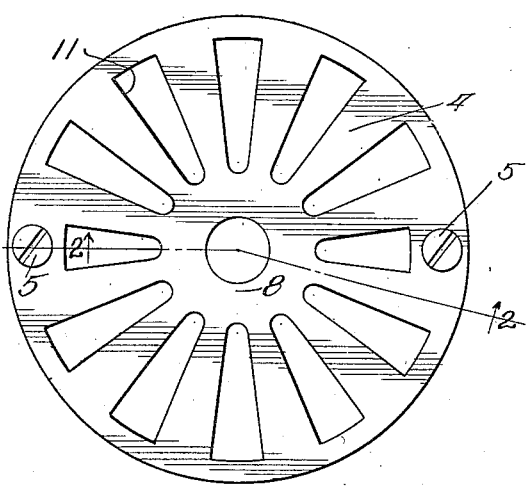
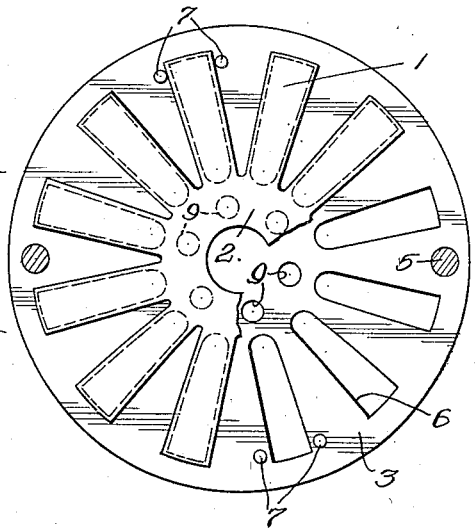
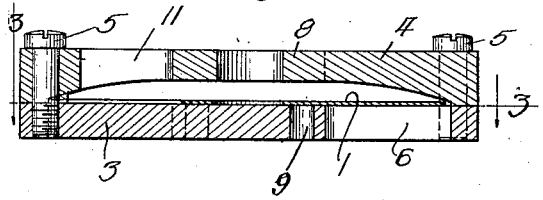
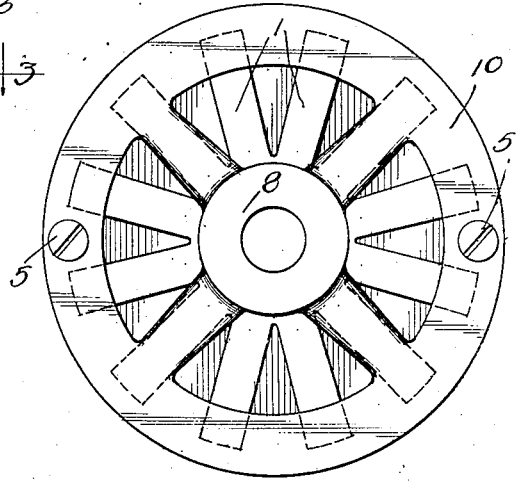
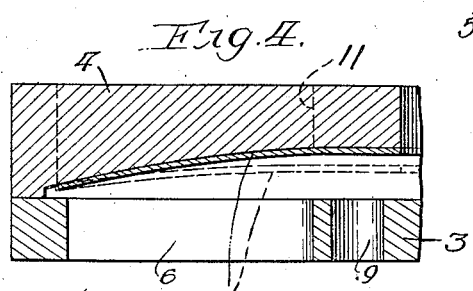
Witness:
Inventor:
Frank L. Henig
by Albert Scheible
Attorney

UNITED STATES PATENT OFFICE.

FRANK L. HENIG, OF CHICAGO, ILLINOIS, ASSIGNOR, BY MESNE ASSIGNMENTS, TO HENIG ENGINE CO., A CORPORATION OF ILLINOIS.

INLET OR CHECK VALVE.

1,350,610.　　　　　Specification of Letters Patent.　　Patented Aug. 24, 1920.

Application filed December 4, 1918. Serial No. 265,309.

*To all whom it may concern:*

Be it known that I, FRANK L. HENIG, citizen of the United States, residing at Chicago, in the county of Cook and State of Illinois, have invented certain new and useful Improvements in Inlet or Check Valves; and I do hereby declare the following to be a full, clear, and exact description of the invention, such as will enable others skilled in the art to which it appertains to make and use the same.

My invention relates to fluid-operated inlet or check valves; that is to say, valves designed for permitting the passage of fluid in one direction only, and designed to be operated automatically by the pressure of fluid in one direction or by a corresponding negative pressure or suction in the opposite direction. Generally speaking, my invention aims to provide a valve of this class which will be simple and cheap in construction, which will afford relatively large passages with a comparatively small movement of the valve member; which will permit the use of so light a valve member that the inertia of the latter will be practically negligible; which will not be likely to become clogged or to have the parts stick to each other; which will so define the flexing of the valve member as to avoid any undue straining of the latter, and in which various operative parts of the valve member will move in unison so as to assist each other in avoiding any sluggishness due to sticking or clogging. My invention also aims to provide a valve construction employing separate flexible elements for closing different ports, and one in which these elements are free to adjust themselves to irregularities in the seat portions against which they impinge, while still connecting these separate portions of the valve member so that they will all move to some extent as a unit. Furthermore, my invention aims to provide a valve employing flexible strips as closure elements, but so arranged that the free ends of these strips will not be free to vibrate, and hence will not produce corresponding musical tones; also, to so arrange the valve that the movable member will speedily move a sufficient distance from the ports to afford the desired size of passages.

Still further objects will appear from the following specification and from the accompanying drawings in which—

Figure 1 is a plan view of a valve embodying my invention.

Fig. 2 is a transverse section through the same, taken along the line 2—2 of Fig. 1.

Fig. 3 is a plan view of the same valve with the cover removed and with a portion of the spider or movable valve member cut away to expose corresponding portions of the lower casing member.

Fig. 4 is an enlarged fragmentary and vertical section taken centrally along one of the radial arms of the movable valve member showing the latter both in its fully raised position, and in dotted lines in an intermediate position.

Fig. 5 is a plan view of another embodiment of my invention, namely one in which the upper casing portion consists of two concentric rings connected only by four arms in alinement with a corresponding number of arms of the spider or movable valve member.

In the main embodiment of the drawings, the movable valve member consists of a spider formed of thin and resilient metal or other flat sheet material and having arms 1 extending substantially radially from the hub, thus comprising a cheaply and easily made punching. This metal spider is disposed within a casing comprising a lower or seat portion 3 and a cover portion 4 secured to the latter by means of screws 5, the casing portions being arranged for permitting a predetermined lifting of the valve member flatwise away from the seat member 3 and for permitting a relatively greater movement of the central portion of this valve member in the same direction. The seat 3 has ports 6 radially disposed about the axis of the casing and opposed respectively to the arms 1 of the metal spider, these ports being normally closed respectively by the spider arms, as indicated in Fig. 3. To prevent the metal spider from rotating to positions in which the arms would no longer aline with the ports 6, I provide suitable coöperating formations on the spider and one of the casing members, as for example pins 7 fast upon the seat 3 and laterally engaging certain of the arms of the spider.

The portion of the seat 3 normally engaged by the hub of the spider is desirably flat, and the cover portion of the valve casing desirably has a central hub portion parallel to the said flat portion of the seat and equal in diameter to the hub of the spider. This flat central portion 8 of the cover is therefore adapted to engage the hub of the spider without flexing this hub, but the said cover portion is spaced from the seat by a considerably greater distance than that between the portions of the casing member which serve as stops for limiting the to-and-fro movement of the free ends of the arms of the spider. Consequently, a movement of the spider by fluid pressure exerted through the ports of the seat member will first raise the spider bodily off its seat until the free ends of the arms are stopped by the cover, and will thereafter flex these arms until the hub of the spider is stopped flatwise by the hub portion 8 of the cover. To reduce the strains resulting from this flexing and consequently to increase the life of the movable valve member, I preferably form the stop portions 4 of the cover as parts of a curved surface tangential of the flat bottom of the hub 8 of this cover, thereby insuring a gradual curving of the arms and one which will permit of a prolonged and rapidly repeated operation of the valve without causing a deterioration of the flexible member.

As an outlet for the fluid when the spider is raised, I desirably equip the cover with ports 11 also arranged radially about the axis of the valve, but out of alinement with the arms of the spider and hence also out of alinement with the ports 6 in the seat member of the valve. Consequently, when the spider is raised, the fluid passing through the ports 6 will issue between the arms of the spider through the ports 11. By suitably proportioning the casing portions, I can readily provide such a bodily lifting of the metal spider and such a flexing of the spider arms as to secure ample passage area for the fluid emitted through the ports of the seat member.

To increase the passage area through the cover, I desirably also provide both the hub of the spider and the hub 8 of the cover with a central perforation through which fluid may pass when the metal spider is flexed away from its seat. I also desirably equip the seat 3 with perforations 9 arranged in a circle opposite the imperforate or annular portion of the hub 2, thereby permitting pressure to be exerted through these auxiliary ports 9 for raising the hub of the valve member off the valve seat.

In practice, I have found that the valve as above described will operate both rapidly and continuously for long periods of time with the movable valve member constructed of quite thin, and therefore very slight sheet metal. Consequently, it requires very little pressure exerted through the ports 6 and 9 to lift the movable valve member off its seat until the free ends of the arms are stopped from further upward movement by engagement with portions of the cover. A further slight pressure will cause the arms to be flexed, raising each arm to the position shown in dotted lines in Fig. 4, and additional pressure will flex the arm as shown in full lines in the same figure, in which last position the hub of the spider bears flatwise against the annular hub of the cover. By thus providing flat and parallel bearings for the hub of the spider, I avoid the necessity of flexing the hub, and therefore avoid the undue strains and consequent deterioration of the metal spider which would be imposed by any endeavor to curve portions of this hub simultaneously in the various directions corresponding to the curvature of the numerous arms. Moreover, by forming the lower surface of the stop portions 4 of the cover tangential of the said flat surface of the hub, I restrict the curving of each arm of the spider to a curvature in which the strain is reduced to a minimum and in which there is substantially no tendency to overstrain each arm at its juncture with the hub of the spider. Also, by definitely limiting the curvature for the entire length of the arm, I avoid the reed effect which would produce a musical tone with any high rate of operation if the top portion of any arm were free to vibrate.

Likewise, by thus joining all of the arms or individual port closures into a single valve member, I cause them to move in unison, thereby increasing the rapidity of action of the valve over what it would be if each port were closed by a separate strip as has heretofore been proposed. So also, by thus uniting the arms into a common structure, I avoid the tendency which any one arm might have toward sticking, owing possibly to impurities in the liquid if the valve is used with a liquid, or to an undue viscosity of the liquid. Any such sticking action is also instantly overcome by the pressure of fluid through the auxiliary port 9, so that I am able to secure speedy, noiseless and positive action even with impure liquids, while affording a total passage area of considerable size in a valve which occupies very little space longitudinally of the duct controlled by it. However, while I have pictured the movable valve of my invention as having sheet metal arms integral with a hub of the same material, and kept from rotation with respect to the seat portion of the casing by guide pins 7, I do not wish to be limited to these or other details of the construction here disclosed, it being obvious that the same might be varied in many respects without departing from the spirit of my invention. For example, instead of providing a separate stop portion 4 on the spider, I may reduce these stop portions in number. Thus, Fig. 5 shows a cover comprising an inner ring 8 connected to an outer ring 10 by only four arms respectively disposed opposite a corresponding number of arms of the spider.

I claim as my invention:

1. In a valve, a valve member comprising a spider of sheet material having flexible arms radiating from a perforated hub, a seat member upon which the valve member normally rests, the seat member having an imperforate hub of greater diameter than the perforation in the valve member and having ports smaller than and respectively in alinement with the arms of the valve member; a stop element in alinement with but normally spaced from the hub of the valve member and substantially equal in diameter to the latter and having a perforation in alinement with the perforation of the hub, and stop means spaced by a relatively less distance from the free ends of the valve member for limiting the movement of the said ends away from the said seat.

2. A valve member comprising a centrally perforate hub and arms of flexible material carried by and radiating from the hub; and a two-part casing within which the valve member is shiftable by fluid pressure; one part of the casing having a flat portion transverse of its axis and equipped with a perforation smaller in diameter than the hub, and the other having a flat portion equipped with perforations out of alinement with the said perforations, both of the said flat portions being disposed for engaging the said hub; the two ports of the casing also having ports disposed on one part for alinement with the arms of the valve member and on the other part out of alinement with the said arms.

3. A valve member comprising a centrally perforate hub and arms of resilient sheet material radiating therefrom; and a two-part casing within which the valve member is shiftable by fluid pressure; the said casing including a seat member having an imperforate central portion opposite the central perforation in the valve member and having ports arranged in two circles disposed respectively opposite the hub of the valve member and opposite the arms of the latter, and a cover member including two rings disposed respectively opposite the hub and the free arm ends of the valve member.

4. In a valve, a casing having a seat formed with a port and a valve having a hub and integral arms radiating therefrom, said casing being formed to permit bodily shifting of the valve up from its seat, said hub having an imperforate part alining with the port of the seat whereby to effect raising of the valve up from its seat by the fluid pressure impacting against the hub.

5. In a valve, a casing having a seat, a valve having a hub and integral arms radiating therefrom, and a cover over the seat formed to allow the valve to bodily shift and to uniformly flex in a dome-like formation, said cover being formed to prevent the tips of the arms from scraping against the seat during and when the valve is at its maximum of flexure.

6. In a valve, a casing having a seat, a valve having a hub and integral arms radiating therefrom, and means to engage the valve upon response thereof to pressure to impart a dome-like conformation thereto and to prevent the tips of the arms from scraping against the seat during the valve movement and upon completion of movement thereof.

7. In a valve, a casing having a seat, a valve having a hub and integral arms radiating therefrom, and a stop member overlying the seat and formed with an uninterrupted dome-like under face terminating at the base of the dome at a distance above the seat in excess of the thickness of the valve, and a circular vertical wall between the seat and the base termination of the dome-like face.

8. In a valve, a casing having a seat, a valve having a hub and integral arms radiating therefrom, and a cover having a dome-like under face and arranged above the seat with distance between the base termination of the dome-like face and the seat in excess of the thickness of the valve, said hub being formed with an imperforate annular part and the seat being formed with a circular series of ports alined with the annular imperforate part of the hub.

9. In a valve, a casing having a seat, a valve having a hub and integral arms radiating therefrom, and a cover having a dome-like under face and arranged above the seat with distance between the base termination of the dome-like face and the seat in excess of the thickness of the valve, said hub being formed with an imperforate part and said seat having a fluid outlet whereby the fluid may act against said imperforate hub part and uniformly and bodily first raise the valve and then force same into conformable engagement with the dome-like under face of the cover.

10. In a valve, a casing having a seat, a valve having a hub and integral arms radiating therefrom, a cover having a dome-like under face which extends in a continuous and uninterrupted curve and terminates in a plane spaced above the plane of the seat and at a distance above the latter in excess of the thickness of the valve, and guiding means for opposite arms engaged with each of the opposite sides of the arms whereby to assist upward movement of the valve without the tips of the arms thereof engaging the cover or scraping against the seat.

Signed at Chicago, Illinois, November 30th, 1918.

FRANK L. HENIG.